Oct. 23, 1928.
N. E. METHLIN
1,688,550
INTERNAL COMBUSTION ENGINE
Filed Dec. 3, 1925   5 Sheets-Sheet 3
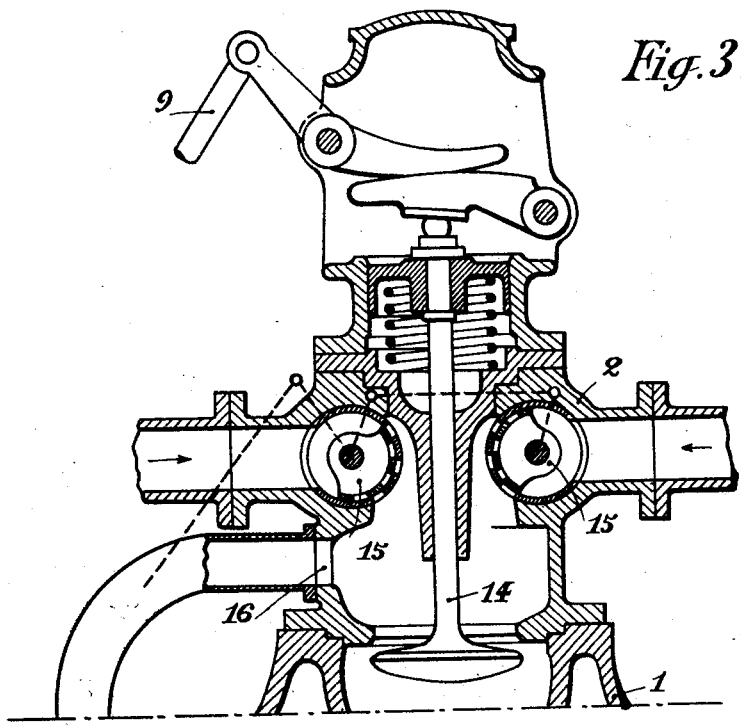
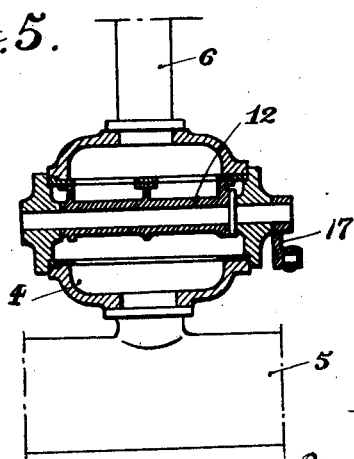

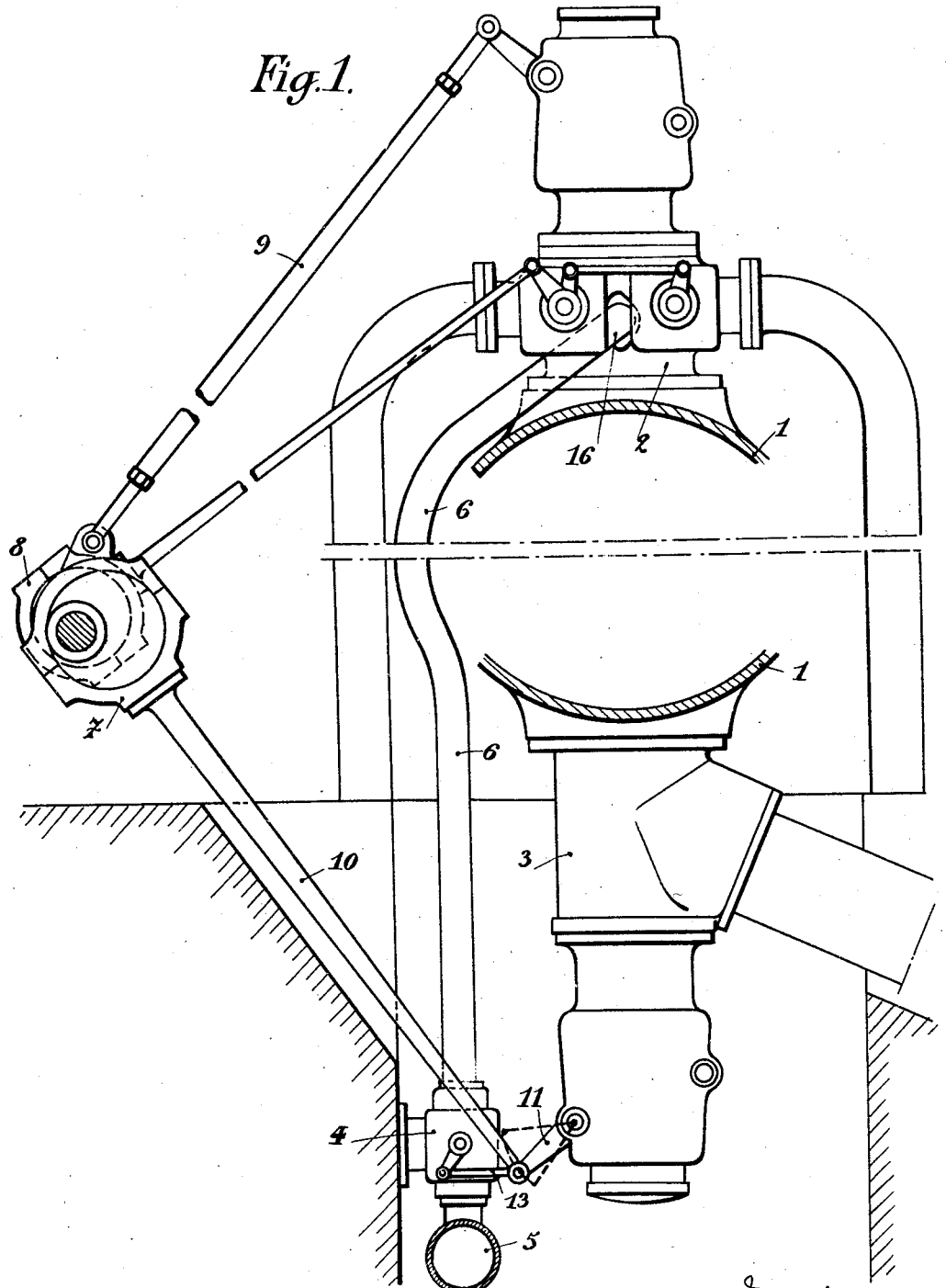

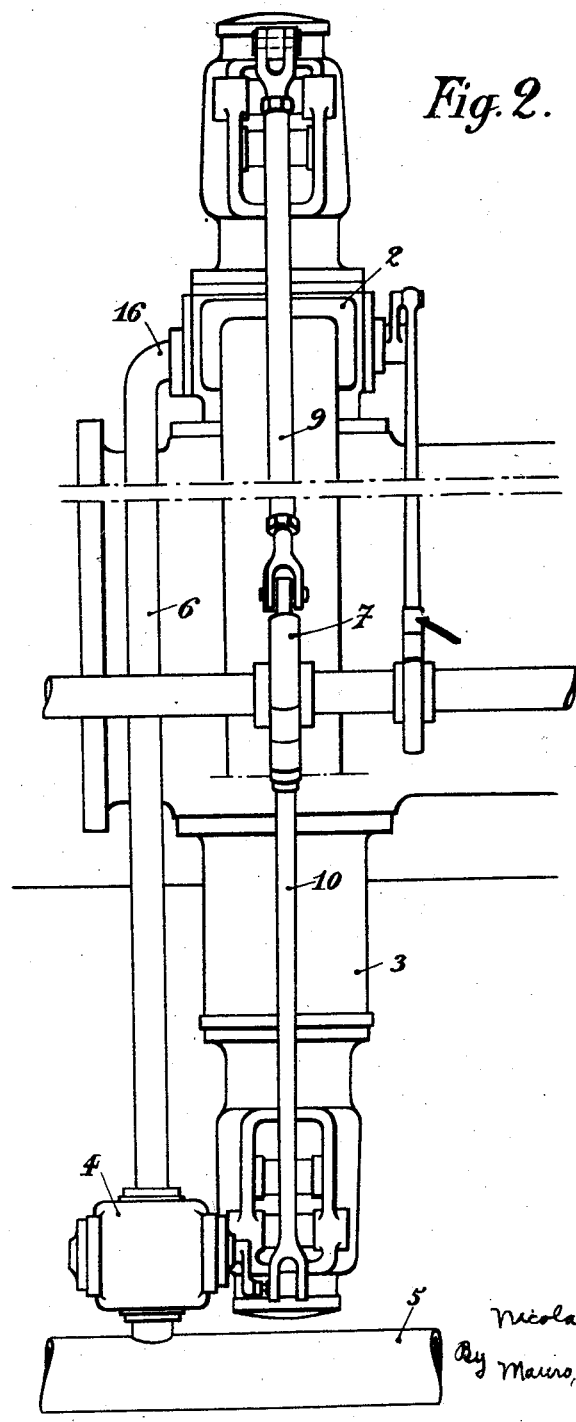

Oct. 23, 1928.

N. E. METHLIN 1,688,550

INTERNAL COMBUSTION ENGINE

Filed Dec. 3, 1925   5 Sheets-Sheet 4

Inventor:
Nicolas Emilien Methlin
By Mauro Cameron, Lewis &
    Kerkan
        Attorneys Oct. 23, 1928.
N. E. METHLIN
1,688,550
INTERNAL COMBUSTION ENGINE
Filed Dec. 3, 1925
*Fig. 7.*
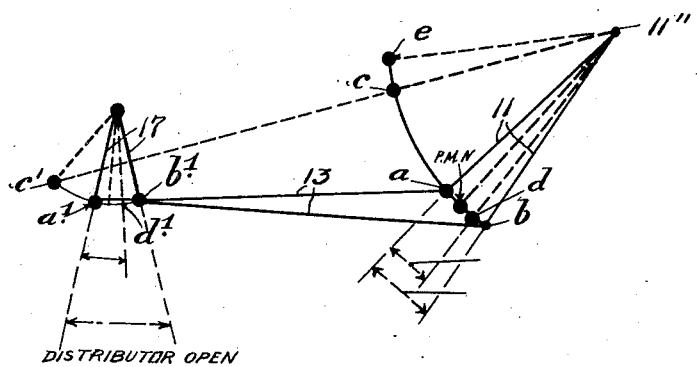
DISTRIBUTOR OPEN
*Fig. 8.*     *Fig. 9.*     *Fig. 10.*
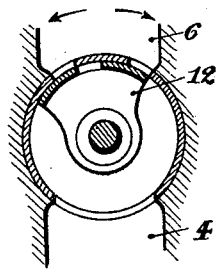 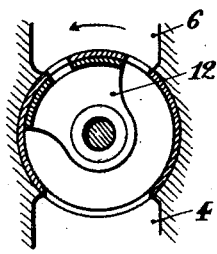 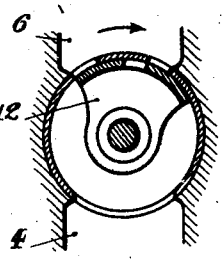

Patented Oct. 23, 1928.

1,688,550

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT-STOCK COMPANY OF FRANCE.

INTERNAL-COMBUSTION ENGINE.

Application filed December 3, 1925, Serial No. 73,070, and in France January 16, 1925.

It is known that the object in scavenging the products of combustion in engines employing an explosive mixture is to scour the combustion chamber of the products which are left in it, by introducing into the cylinder, towards the end of the exhaust stroke, a certain amount of air under pressure, provided by an external source of supply. This air thus takes the place of the burnt gases and forces them before it into the exhaust pipe, so that at the beginning of the suction stroke the combustion chamber contains nothing but almost pure air which is carburetted by the gas drawn in during the admission stroke and enables a much higher output to be obtained from the machine, while improving the ignition of the charge.

In known arrangements, scavenging is generally assured, either by a means of valves controlled by cams and levers, or by means of an annular member mounted on the rod of the admission valve.

The first arrangement is complex, and moreover, the control of the valves by cams and rollers does not permit of obtaining openings and closings which are suitably rapid to assure the large openings necessary for the passage of the air introduced in a relatively short time.

In the second arrangement, the annular member uncovers the scavenging orifices not only at the commencement of the lifting of the admission valve to effect scavenging, but likewise at the time of closing of the same, which causes a choking effect of the air introduced, so that, when the admission valve is on its seat, the air under pressure remains in communication with the interior of the admission chamber and may consequently penetrate into the collector of gas and thus cause untimely explosions. Such an arrangement, moreover, renders it difficult to assure a good explosive mixture with weak charges.

Finally, these two arrangements do not permit of adaptation to existing machines, without important modifications of the distribution mechanism.

The mechanism constituting the object of the present invention obviates these inconveniences. It constitutes an original arrangement, additionally capable of being applied equally well to distributions with quality regulation or quantity regulation whereof the valves, or at least the exhaust valve, are actuated by eccentrics.

It is characterized by the fact that the compressed scavenging air is delivered by a distributor provided with a rotary valve or the like closing member, such as a butterfly valve, slide valve, etc., with rapid opening and closing, controlled by the mechanism for governing the exhaust valve, which is logical, as the introduction of scavenging air should cease at the moment when the exhaust valve just rests on its seat. Practically, the closing member may be controlled with the aid of a crank by the exhaust valve lever.

In the example illustrated it has been assumed that the distributor is provided with a valve connected on the one hand to the collector of scavenging air under pressure and on the other hand, by a suitable pipe, to the corresponding admission chamber. With such an actuating arrangement the valve of the distributor is controlled by the exhaust valve, which is rational, since the scavenging has to cease as soon as this valve rests on its seat. Finally the connection between the valve lever and the valve of the distributor is such that the latter is given a rapid opening and closing movement in order that it will have a large section of opening during the whole of its action.

Figures 1 and 2 illustrate, by way of example, and in side and front elevation respectively, the device fitted to a working cylinder provided with the known valve gear hereinbefore mentioned.

Figure 3 illustrates in section the admission chamber of the latter with the scavenging pipe.

Figure 5 shows a longitudinal section through the valve (Figs. 3, 4 and 5 are drawn to a larger scale than Figs. 1 and 2).

Figure 7 is a diagram of the motions of the mechanism of the scavenging air distributing valve.

Figures 8, 9 and 10 show the different positions of the scavenging air distributing valve during the working of the engine.

Figure 6:
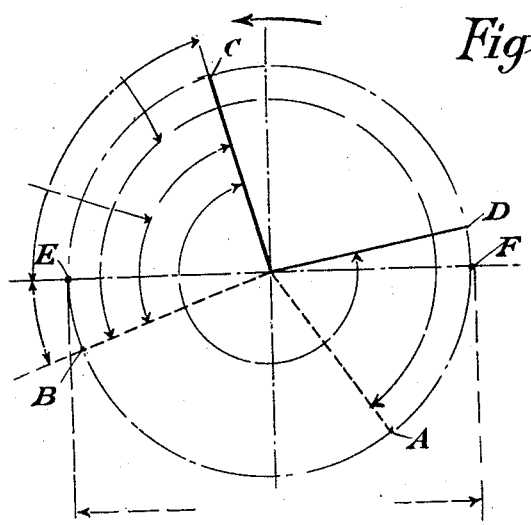
Figure 6 is a diagram of the distribution phases of the engine.

In Figures 1 and 2, 1 is the working cylinder, 2 the admission chamber, 3 the exhaust chamber, 4 the scavenging air valve, 5 the collector of scavenging air under pressure, 6 the pipe connecting the scavenging air distributing value to the admission chamber, 7 the eccentric actuating the admission and exhaust valves, 8 the eccentric actuating the air and gas distributing valves, 9 the admission rod, 10 the exhaust rod, 11, 11' the lever, pivoted at 11'', actuating the exhaust valve.

The valve 12 of the distributor 4 (see Fig. 4) is connected by means of a crank 17 and the small connecting rod 13 to the arm 11 of the lever 11, 11'.

Fig. 6 illustrates the stroke of the piston or rotation of the driving crank, the direction of rotation being indicated by an arrow. The reference characters E and F represent the dead center positions of the piston, and the reference characters A and B represent, respectively, the opening and closing of the exhaust valve relative to the stroke of the piston. Thus the period of rotation during which the exhaust valve is open is represented by the arc A B.

Figure 4:
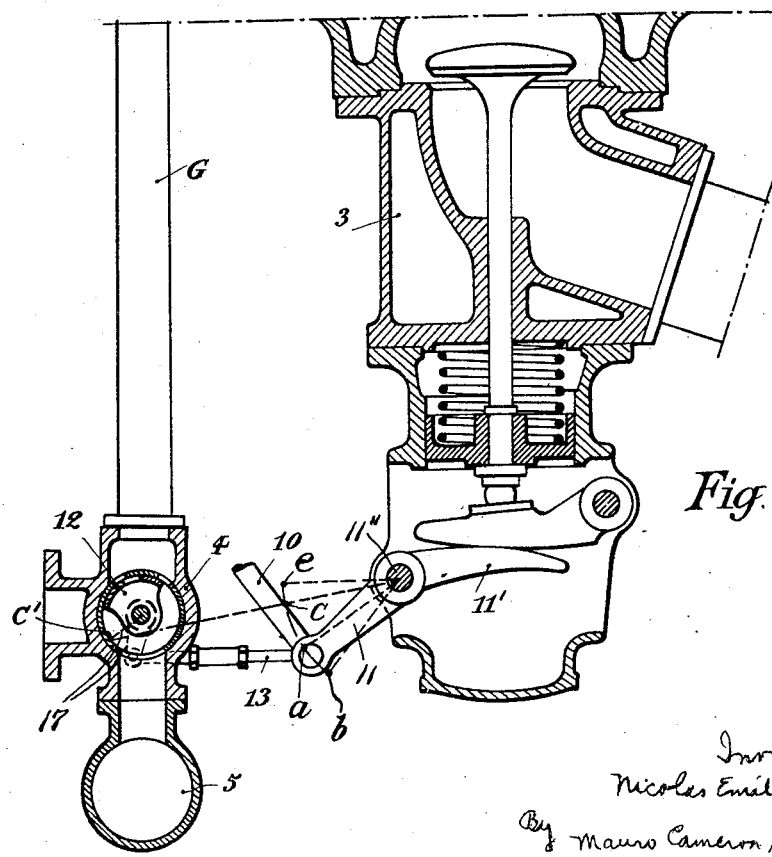
Figure 4 illustrates an exhaust chamber connected to the scavenging device.

Fig. 7 represents diagrammatically the movements of the mechanism operating the exhaust valve and the distributor 12 which is illustrated in Fig. 4. In Fig. 7 points $e$ and $b$ correspond to points $e$ and $b$ of Fig. 4 and indicate the extreme positions of the arm 11 operating the exhaust valve, and points $c'$ and $b'$ similarly indicate the extreme positions of the distributor 12, $c'$ corresponding to the position $c$ of the arm 11. During the stroke A B the lever 11 travels over the arc $a$—$b$—$a$ (Fig. 7) and the valve 12 moves over the arc $a_1$—$b_1$—$a_1$, so that this valve opens and closes the ports of the distributor 4 and, consequently, the communication between the scavenging air collector 5 and the admission chamber 2 at the moment when the exhaust valve lifts and closes. Figure 8 shows the position of the valve 12 corresponding to these two points. Apart from the exhaust stroke, the collector 5 is cut off from communication with the admission chamber 2 and the scavenging air under pressure cannot therefore enter into the latter.

The reference characters C and D represent, respectively, the opening and closing of the admission valve 14, and the arc C—D therefore represents the period of rotation of the driving crank during which said valve is open. At the point C, with a suitable angle of advance, the admission valve 14 (Fig. 3) lifts, but the atmospheric air and gas distributing valves 15 continue to cover the ports of the admission chamber. At this moment the valve 12 of the distributor is in the position shown in Figure 9; the ports of this valve are fully open and the scavenging air, passing through the pipe 6, enters into the cylinder. This entry takes place while the arc C—B is traced. At the point B, the exhaust valve rests on its seat and the distributing valve 12 is in the position shown in Figure 8, covering thus the ports of the distributor, so that the scavenging air ceases to enter into the cylinder. The distributing valves 15 of the admission chamber 2 then uncover the ports of the latter, and the atmospheric air and the gas are drawn into the cylinder until the end D of the suction stroke, with quality governing, or during a stroke which is a function of the power required from the machine, with quantity governing. In the latter case, the distributing valves, the movement of which is independent of that of the admission valve, close their ports when the charge of mixture admitted is sufficient, the valve only returning to its seat when the driving crank is at the point D.

Thus scavenging takes place while the driving crank traces the arc C—B, during which arc the admission and exhaust valves are raised. In order to allow this scavenging to be effected, it is necessary, on the one hand to raise the admission valve with a sufficient advance during which the driving crank travels over the arc C—E before arriving at its dead centre, and on the other hand to close the exhaust valve with a suitable retard, during which the driving crank sweeps out the arc E—B.

Figure 10 shows the distributing valve 12 when it has made its maximum stroke, covering the ports of the valve.

As will be seen, the scavenging air collector 5 is in communication with the admission chamber, while the valve 14 is closed, during only a very small movement of the driving crank, represented by the exhaust travel minus the scavenging travel, that is to say during a sufficiently small time for this air under pressure not to pass into the gas pipe if the corresponding distributing valve 15 is not quite fluid-tight.

Further, the addition of the device to an existing machine necessitates no other modification than the piercing of a port 16 for admitting the scavenging air into the admission chamber 2.

Finally, the device is governed, once and for all, when the engine is started, and its operation remains uniform while it is working whatever be the power required of the machine.

As mentioned above, the scavenging air distributor may comprise a rotary valve or a piston valve, or any other member which is capable of performing the same function. Further it is not absolutely necessary to place this distributor near the exhaust chamber, as shown in the figures; if the arrangement of the machine requires it, the distributor may be placed in another position, for example near the corresponding admission chamber, or upon the latter, the kinematic connection between the member 12 and the lever 11 being provided with convenient transmission members.

Claims:—

1. Scavenging means for an internal combustion engine having a combustion chamber and an admission chamber comprising, in combination with exhaust and admission valves, a distributor of scavenging air under pressure connected with said admission chamber, a control valve for controlling the supply of scavenging air to said admission chamber, and means for opening and closing said control valve and exhaust valve substantially simultaneously, said valves being adapted to admit scavenging air to said combustion chamber when said admission valve opens.

2. In an internal combustion engine having a combustion chamber and admission and exhaust valves therefor, a lever operating said exhaust valve, and a control valve operatively connected to said lever for admitting air under pressure to the admission valve port, said control valve being adapted to open prior to said admission valve and to remain open and to close with said exhaust valve.

3. In an internal combustion engine having a combustion chamber and admission and exhaust valves therefor, means for scavenging the products of combustion of said engine including a collector of air under pressure, means for connecting the latter to the admission valve port, a valve controlling the supply of air to said chamber, and common means for opening and closing said last-named valve with said exhaust valve.

4. In an internal combustion engine having a combustion chamber and admission and exhaust valves therefor, means for supplying scavenging air to the admission valve port of said chamber, a control valve for controlling the supply of said air, and means operatively connected to said exhaust valve for opening and closing said control valve with said exhaust valve, whereby air under pressure is admitted to said valve port before said admission valve lifts and is cut off therefrom when said exhaust valve closes.

5. In combination with an internal combustion engine having a combustion chamber and admission and exhaust valves therefor, means for scavenging the products of combustion from said chamber including a distributor of air under pressure connected with the admission valve port, a control valve for controlling the supply of said air to said admission port, and means operatively connecting said control valve and exhaust valve for operating said valves at the same time, whereby scavenging commences when said admission valve lifts and ends when said exhaust valve closes.

6. In an internal combustion engine of the type having a combustion chamber, admission and exhaust valves therefor, an admission chamber communicating with said combustion chamber through the admission valve port, and additional valves controlling the admission of air and gas to said admission chamber, scavenging means comprising a collector of air under pressure, a conduit connecting the latter with said admission chamber, a rotary distributing valve for said conduit, and means for simultaneously opening and closing said exhaust valve and said distributing valve.

7. In an internal combustion engine of the type having a combustion chamber, admission and exhaust valves therefor, an admission chamber communicating with said combustion chamber through the admission valve port, and a pair of valves controlling the admission of air and gas to said admission chamber, scavenging means comprising a collector of air under pressure, a conduit connecting the latter with said admission chamber, a rotary distributing valve in said conduit, and common means for simultaneously opening and closing said exhaust valve and said distributing valve, whereby air under pressure is admitted to said admission chamber before said admission valve lifts and is cut off from said admission chamber when said exhaust valve closes.

In testimony whereof I have signed this specification.

NICOLAS EMILIEN METHLIN.